May 18, 1926.
F. A. RAFFERTY
CONSTANT INDICATOR FOR VIBRATORY CIRCUITS
Filed June 21, 1923
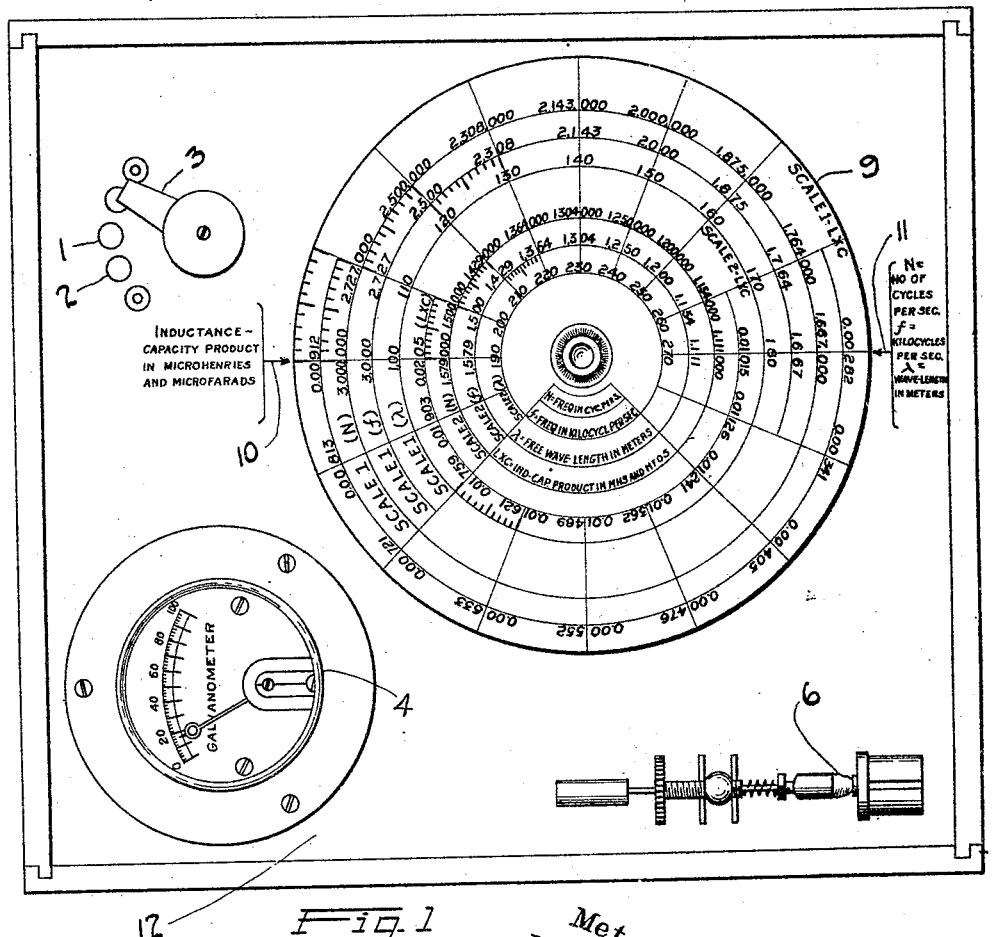
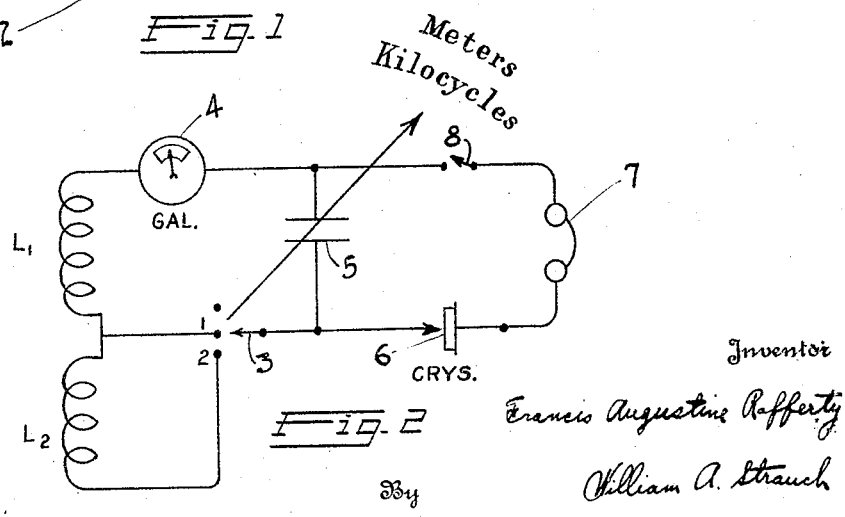

Patented May 18, 1926.

1,584,893

UNITED STATES PATENT OFFICE.

FRANCIS AUGUSTINE RAFFERTY, OF VILLANOVA, PENNSYLVANIA.

CONSTANT INDICATOR FOR VIBRATORY CIRCUITS.

Application filed June 21, 1923. Serial No. 646,799.

This invention relates to a kilocyclometer or frequency meter for the purpose of measuring electromagnetic waves or vibrations. More particularly it relates to a frequency meter of the character described in which various wave and circuit constants may be read at a glance from a single dial setting.

An object of the invention is to provide a meter in which frequency of electromagnetic waves may be read directly in kilocycles, and cycles, the wave length may be read in meters, and the product of inductance and capacities in micro-henries and micro-farads, of circuits resonant to the various waves may be directly read.

Another object of the invention is to provide a graduated computing dial for a wave meter.

Further objects of the invention will appear in the following detailed description and claims.

Figure 1 is a plan view of a wave meter to which a form of invention has been applied.

Figure 2 is a circuit diagram of a form of wave meter.

Referring to the drawings, 1 and 2 are contact points of a switch 3 to connect into the circuit inductance coils $L_1$ and $L_2$. A hot wire or thermocouple galvanometer 4 is connected in circuit with variable condenser 5. Connected across condenser 5, and in circuit with a crystal detector 6, is a pair of head phones 7, adapted to be connected in a circuit by a switch 8. Movable with the adjusting member of condenser 5 is a graduated dial 9. Dial 9 is rotatable about its center and the circumference registers with two index, 10 and 11, markers engraved in the upper panel 12 of the meter box. By rotating the dial in well known manner, the capacity of condenser 5 is varied to vary the circuit constants. The details of such condensers are well known and form no part of the present invention.

With the inductance values of $L_1$ and $L_2$ known, and the capacity of the variable condenser 5 known for the various dial positions, scale 1 is engraved on the dial in the manner shown, to give with switch 3 on point 1, the value of the capacity-inductance product of the circuit in micro-henries and micro-farads at index 10 on the outer circle marked scale 1—LXC; the frequency in cycles and kilocycles at index 11 and on the circular divisions marked scale 1 (N), and scale 1 ($f$) respectively; and the wave length in meters at index 11 on the circular division marked scale 1 ($\lambda$). In similar manner, scale 2 is divided into circular sections to give the readings of the capacity-inductance product, frequency in cycles and kilocycles, and the free wave length in meters, for the various positions of dial 9, when switch 3 is on point 2. It will be apparent that any desired number of scales may be provided for different inductance values by adding to the number of coils and switch points, and graduating circular divisions therefore on the scale in the manner set forth. It will also be understood that readings on all the different radial circular divisions are taken along radial lines emanating from the center of dial 9 to the index marks 10 and 11, and that as many of these radial lines may be engraved in the dial as may be desired for convenience in reading the dial. Preferably, full radial divisions are made at regular and relatively great angular distances, as shown, and interposed between the full radial lines are short radial division lines around the outer circle of each scale division as indicated in one sector only of each circular division on the drawing.

The following examples will disclose the manner of operating the meter. Assuming that the meter has been used to measure electro-magnetic vibrations, and the setting shown in Figure 1 gives a maximum reading of the galvanometer, with the switch 3 on point 1, the wave frequency will be 1,667,000 cycles, and 1,667 kilocycles; the wave length will be 100 meters and the product of the inductance and capacity in micro-henries and micro-farads to produce a resonant circuit will be 0.00912. With switch 3 on point 2, the wave frequency will be 1,111,000 cycles and 1,111 kilocycles; the wave length will be 270 meters and the capacity-inductance product in micro-henries and micro-farads will be 0.0205 for a resonant circuit. Having the capacity-inductance product for a circuit to produce a particular wave length or frequency, a circuit to produce the desired wave may readily be designed.

To find the capacity necessary to be used with an inductance of 3 micro-henries to produce a circuit which will oscillate at 2000 kilocycles, the dial 9 is set with index 11 on the radial line passing through the 2000 kilocycle reading. This is on division

*f* of scale 1. Reading at pointer 10 on scale 1, LXC, the capacity-inductance product is found to be 0.00633. Dividing this product by 3, the result is found to be 0.00211 micro-farads.

To find the wave length having given the values of the circuit capacity and inductance in micro-henries and micro-farads, these values are multiplied together, the product is set on a radial line with index 10, and the wave length in meters and frequency in cycles and kilocycles may be read on the proper scale from index 11.

It will be obvious that in this manner, having given one of the values graduated on the dial, by a single setting, all of the others may be directly read. In addition, a single setting of the dial will give all of these constants when the meter is used in the usual way to measure incoming wave lengths.

Having described a preferred embodiment of the invention, what is desired to be secured by Letters Patent and is claimed as new is:

1. An indicator for vibratory circuits comprising a rotary dial; graduations representing vibratory wave constants applied to an angular sector of said dial; an index marker co-acting with said wave constant graduations; graduations representing electrical constants of circuits resonant to the waves represented by said vibratory constant graduations applied to a different angular sector partially overlapping said first mentioned angular sector of said dial; and an index marker coacting with said last mentioned graduations and so positioned with respect to said first index marker that a single setting of said dial will indicate the vibratory wave constants and circuit constants of a circuit resonant with the wave of which the vibratory constants are indicated at said first mentioned marker.

2. A computing indicator as set forth in claim 1 in which the vibratory wave constants are indicated in wave lengths, cycles, and kilocycles by said first mentioned index marker, and in which the inductance-capacity product of said resonant circuits are simultaneously indicated by said last mentioned marker.

Signed at Villanova, Pa., this 15th day of June, 1923.

FRANCIS AUGUSTINE RAFFERTY.